(12) United States Patent
Taillon

(10) Patent No.: US 7,938,451 B2
(45) Date of Patent: May 10, 2011

(54) MULTIFUNCTIONALLY SWIVELLING COUPLING ASSEMBLY FOR FLUID LINES

(75) Inventor: Michel Taillon, Saint-Prime (CA)

(73) Assignee: Taimi R&D Inc., Saint-Prime, QC (CA)

( * ) Notice: Subject to any disclaimer, the term of this patent is extended or adjusted under 35 U.S.C. 154(b) by 394 days.

(21) Appl. No.: 11/785,740

(22) Filed: Apr. 19, 2007

(65) Prior Publication Data

US 2008/0012307 A1  Jan. 17, 2008

Related U.S. Application Data

(60) Provisional application No. 60/792,981, filed on Apr. 19, 2006.

(51) Int. Cl.
*F16L 27/00* (2006.01)

(52) U.S. Cl. ..................... 285/121.3; 285/272

(58) Field of Classification Search .............. 285/121.3, 285/121.6, 121.7, 148.4, 144.1, 272, 261, 285/138.1, 124.4, 282, 121.1, 121.2
See application file for complete search history.

(56) References Cited

U.S. PATENT DOCUMENTS

| | | | | | |
|---|---|---|---|---|---|
| 783,301 | A | * | 2/1905 | McMillan | 285/138.1 |
| 785,871 | A | * | 3/1905 | Glazier et al. | 169/40 |
| 929,734 | A | * | 8/1909 | Walder | 285/280 |
| 1,118,970 | A | * | 12/1914 | Thompson | 285/138.1 |
| 1,190,209 | A | * | 7/1916 | York | 285/148.4 |
| 1,228,733 | A | | 6/1917 | Aebli | |
| 1,930,833 | A | * | 10/1933 | Barrett | 285/281 |
| 2,323,701 | A | * | 7/1943 | Barksdale | 239/246 |
| 2,502,365 | A | * | 3/1950 | Bard | 285/121.7 |
| 2,666,656 | A | * | 1/1954 | Bruning | 285/138.1 |
| 3,007,747 | A | | 11/1961 | Isler | |
| 3,165,339 | A | | 1/1965 | Faccou | |
| 3,510,155 | A | * | 5/1970 | Jacobus | 285/98 |
| 3,533,557 | A | * | 10/1970 | Ingram et al. | 239/734 |
| 3,753,575 | A | * | 8/1973 | Tracy | 285/124.4 |
| 3,877,732 | A | | 4/1975 | Mohaupt | |
| 3,936,079 | A | * | 2/1976 | Ekman | 285/98 |
| 3,957,291 | A | * | 5/1976 | Edling et al. | 285/121.7 |
| 4,124,206 | A | * | 11/1978 | Price | 482/81 |
| 4,129,306 | A | * | 12/1978 | Konno et al. | 277/507 |
| 4,154,551 | A | | 5/1979 | Petrie | |
| 4,411,545 | A | | 10/1983 | Roberge | |
| 4,669,760 | A | | 6/1987 | Hashish et al. | |
| 4,716,934 | A | * | 1/1988 | Levenez | 137/625.21 |
| 4,998,755 | A | * | 3/1991 | Reeder | 285/181 |

(Continued)

FOREIGN PATENT DOCUMENTS

CA  1105801  7/1981

(Continued)

*Primary Examiner* — Aaron Dunwoody
(74) *Attorney, Agent, or Firm* — Jacobson Holman PLLC

(57) ABSTRACT

A swivelling coupling assembly for providing a swivellable interconnection between fluid-containing lines. The assembly includes a housing and a retention member for retaining the housing while cooperating with it to allow the housing to spherically swivel therein. The housing has a bore for allowing hydraulic fluid to flow between the interconnected lines. The assembly also includes at least one male component removably mountable within the bore of the housing to be swivellable therein and to prevent external leakage of the fluid. The male component is connected to one line and has a canalization allowing the fluid to flow between the pair of lines through the assembly. Multifunctional swivel functionality is achieved to reduce the torsion on interconnected lines, such as during operation with dynamic machinery.

18 Claims, 11 Drawing Sheets

U.S. PATENT DOCUMENTS

| | | | |
|---|---|---|---|
| 5,018,546 A | 5/1991 | Carmack et al. | |
| 5,275,444 A | 1/1994 | Wythoff | |
| 5,409,324 A | 4/1995 | Johnson | |
| 5,462,230 A * | 10/1995 | Van Ouwerkerk | 239/428.5 |
| 5,507,534 A | 4/1996 | Reifenberger et al. | |
| 5,671,816 A | 9/1997 | Tibbitts | |
| 5,920,934 A * | 7/1999 | Hannagan et al. | 5/713 |
| 5,975,490 A | 11/1999 | Essman | |
| 6,123,268 A * | 9/2000 | Chastine | 239/1 |
| 6,220,636 B1 | 4/2001 | Veloskey et al. | |
| 6,746,056 B2 | 6/2004 | Palmer | |
| 6,776,552 B2 | 8/2004 | Marunaka | |
| 2002/0041098 A1 | 4/2002 | Cooper | |
| 2005/0093295 A1 * | 5/2005 | Byerly et al. | 285/261 |
| 2005/0184510 A1 * | 8/2005 | Langenfeld et al. | 285/124.1 |

FOREIGN PATENT DOCUMENTS

| | | |
|---|---|---|
| CA | 2254188 | 5/2000 |
| DE | 195 42 562 | 5/1997 |

* cited by examiner

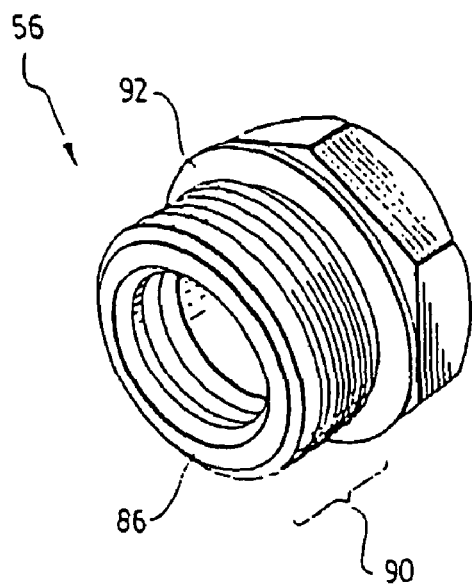
FIG. 15
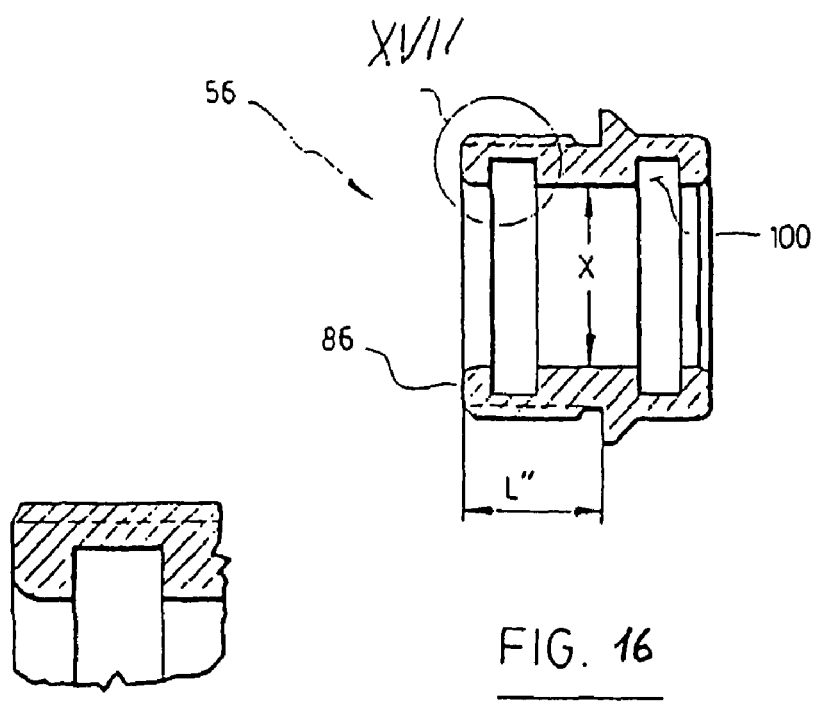
FIG. 16
FIG. 17

MULTIFUNCTIONALLY SWIVELLING COUPLING ASSEMBLY FOR FLUID LINES

This is a complete application claiming benefit of provisional number 60/792,981 filed Apr. 19, 2006.

FIELD OF THE INVENTION

The present invention generally relates to swiveling couplings for fluid lines, and more specifically to swiveling couplings for providing multifunctional swivelling between one or more lines in industrial applications such as hydraulic systems.

BACKGROUND OF THE INVENTION

Couplings and fittings are components that enable ducts, cables, tubes and the like, which may generally be called "lines", to be interconnected. Hydraulic couplings, for example, enable hydraulic lines containing hydraulic fluid to be interconnected to facilitate the functioning and minimize the damage of the hydraulic system.

Swivelling couplings are particularly desired since they enable the lines to move relative to one another. Such movement is especially required when flexible lines are used, and even more so when flexible lines are used in conjunction with dynamic heavy-duty industrial equipment. An example of such dynamic equipment is forestry equipment like feller-buncher machines and other multifunctional heads, which are used in the tight confines of wooded areas in proximity of very heavy trees and elevated forces. Feller-buncher machines have a variety of dynamic moving parts such as mechanical arms, claws, cylinders and motors. Of course, other industrial fields—such as the construction and mining industries—require large dynamic machinery as well. Often, the dynamic parts are powered hydraulically and, consequently, a variety of hydraulic systems—composed of hydraulic rotors, lines, couplings, control means, etc.—are employed.

Hydraulic systems have many preferable attributes, among which are adaptability, efficiency, heavy-dutiness, durability, dynamism, reliability and inexpensiveness.

Accessibility and ease of maintenance are very desirable characteristics of the coupling arrangement in any hydraulic system, especially those in which the couplings are arranged in awkward locations and orientations on the machine, which is done most of the time to protect the couplings from impacts and other damage-causing incidents.

In the prior art, lines are interconnected using a variety of fittings and couplings, some of which provide a rotation functionality between the lines. Often these couplings involve ball or needle bearings, which are susceptible to damage and have limited durability, especially when used in applications where they must endure strong axial forces and lateral impacts.

Furthermore, it is often desired to regroup a plurality of lines into a bundle or "cluster", to organize the lines and to protect them from damages. Such clusters of lines must transport fluid to the required machine parts and depending on the geometrical constraints of the equipment the cluster may be forced to have a nonlinear and sometimes tortuous arrangement. The clusters often terminate at important locations in the hydraulic system. For instance, where hydraulic power is required at a head of a feller-buncher machine, the cluster may terminate in a bundle of fittings at an accessible location near the head, at which point each line may branch off to specific locations on the head.

Moreover, the cluster often supplies fluid to a dynamic part which may rotate, pivot or undergo a variety of other movements which cause the cluster of lines to sustain corresponding torsion, bending or other damaging forces. For example, a feller-buncher head may be rotatable and therefore the hydraulic lines supplying the necessary rotors, cylinders and/or other actuators must deal with these movements.

In the prior art, line clusters are regrouped and mounted to equipment by means of a variety of mounting means including standard clamps, bolts and screws, ropes, chains, homemade manifolds, among other connectors. The lines are sometimes fixedly mounted at their fittings to the super-structure of the machines. Line clusters are often held together using crude fastening means, to help put the couplings and/or fittings out of harm's way. However, this makes maintenance of the couplings very tedious and labour intensive, as the fastenings means must be undone to access a coupling.

In the prior art, line clusters are also regrouped and mounted to equipment using "bulkheads" or "manifolds". For instance, a plurality of lines, each having a standard metallic fitting interconnecting two sides of the line, may be regrouped at a "plate bulkhead". The fitting of each line is welded to a single plate bulkhead, which is in turn connected to the machine by a karabiner. These plate bulkheads offer limited maneuverability and as a consequence the lines are less adaptable to torsion constraints and are thus more susceptible to damage.

There are also "rotatable bulkheads" and "rotatable block manifolds" which interconnect line clusters while providing rotation between the two sides of the rotatable unit. The fittings are connected to the lines and are welded or otherwise secured to a plate. The plate is mounted within a bearing collar, which retains the plate and allows it to rotate. The bearing collar is then mounted to the machine, by a weld, a hinge or a karabiner, for example. These units enable some rotation functionality between the lines, but they are inefficient against torsion and many other dynamic forces. This may lead to damaged lines and/or disconnection of the lines from their fittings due to the torsion. This also provides limited rotation ability of the lines. These units may also be expensive and are inefficient in preventing costly damage to hydraulic lines in particular.

PRIOR ART PATENT DOCUMENTS

There are some patent documents that describe couplings or joints with a swivelling functionality, along one axis or spherically.

The U.S. Pat. No. 6,776,552 (MARUNAKA) describes a ball joint which enables the reduction of rotational friction by incorporating spherical rollers. The spherical joint of MARUNAKA is directed to applications in the field of automobile mechanics.

The U.S. Pat. No. 5,275,444 (WYTHOFF) describes a swivel coupling for the transmission of high pressure fluid. This coupling includes two spherical hemispheres which are connected in order to rotate about an axis. The two hemispheres include cavities and one of the hemispheres includes a neck to which a nut may be connected.

The U.S. Pat. No. 4,411,545 (ROBERGE) and U.S. Pat. No. 3,007,747 (ISLER) describe a universal joint including a spherical housing retained by a ring. The spherical housing has an opening through which a bar may be inserted. The ring includes cooperating grooves in order to facilitate the insertion of the housing therein.

The U.S. Pat. No. 3,165,339 (FACCOU) describes a spherical coupling for transmitting fluids at high or low temperatures. This spherical coupling includes a spherical male element inserted in a female element, these two elements each having a canalized neck. The male and female elements are interconnected by a plurality of rings and screws.

The U.S. Pat. No. 6,746,056 (PALMER) describes a joint for transmitting fluids and for attachment to a spray gun. The joint includes a male spherical component and a corresponding female component. The male component includes a integral canalized tubular member.

Other United States patents and patent applications related to spherical joints and couplings are: Ser. No. 10/408,361 (PALMER), Ser. No. 11/390,562 (CLEMM), U.S. Pat. No. 5,018,546 (CARMACK et al.), U.S. Pat. No. 5,507,534 (REIFENBERGER et al.), U.S. Pat. No. 5,671,816 (TIBBITTS), U.S. Pat. No. 5,975,490 (ESSMAN) and U.S. Pat. No. 6,220,636 (VELOSKEY).

The units for coupling and regrouping fluid lines known in the art present numerous disadvantages. For instance, the known coupling units are mostly crude and unaesthetic, making maintenance and inspection rather difficult, while offering limited protection, functionality, cluster-adaptability and flexibility. Other disadvantages of the known coupling units would be known to a person skilled in the art. There is thus a present need for an advance in the field of coupling units that overcomes at least some of the disadvantages of the prior art.

SUMMARY OF THE INVENTION

The present invention responds to the above-mentioned need by proposing a swivelling coupling assembly for providing a swivellable connection between lines.

In Accordance with a first aspect of the present invention, there is provided a swivelling coupling assembly for providing a swivellable connection between at least a pair of lines containing a fluid. The swivelling coupling assembly includes a housing having external surfaces and a retention member for retaining the housing while cooperating with the external surfaces to allow the housing to swivel therein about at least one axis. The housing has a bore therethrough for each pair of lines, each bore having first and second apertures. The first aperture allows the fluid to flow therethrough from one of the lines. The swivelling coupling assembly also includes at least one male component removably mountable within each bore of the housing to be swivellable therein and to prevent external leakage of the fluid. One of the at least one male component has a port connectable to the other of the lines at the second aperture and has a canalization allowing the fluid to flow between the pair of lines.

By enabling the male component to be swivellable within the housing and enabling the housing to swivel within the retention member, a "double swivel" functionality is provided. Therefore, the first and second lines of the pair can swivel independently, one with the housing and the other with the male component. This provides numerous advantages in adapting to torsion constraints on the lines and improving the safe range of motion of the lines. In addition, when a plurality of lines are interconnected with the coupling assembly, they may be rotated together as a cluster and/or individually, which provides many advantages during operation.

According to another aspect of the present invention, there is also provided a swivelling coupling assembly for providing a swivellable connection between at least a pair of lines containing a fluid, including a housing having external spherical surfaces. The swivelling coupling assembly also includes a retention member for retaining the housing while cooperating with the external surfaces to allow the housing to swivel therein about at least one axis. The housing has a bore therethrough for each pair of lines, each bore having first and second apertures. The first aperture allows the fluid to flow therethrough from one of the lines. The swivelling coupling assembly also includes at least one male component mountable within each bore of the housing and being cooperable therein to prevent external leakage of the fluid. One of the at least one male component has a port connectable to the other of the lines at the second aperture and having a canalization allowing the fluid to flow between the pair of lines.

The spherical swivelling ability enables the housing to have three degrees of freedom to adapt to a wide variety of torsion and other constraints. The male component is insertable within the bore of the housing so that during the swivelling movement of the housing the torsion constraints are withstood by the cooperation between the male component and the bore of the housing. The canalization of the male component also houses the fluid flow from outside the housing to its interior, thus limiting the risk of leaks especially in the case of dynamic spherical movement of the housing. This construction enables less likelihood of leaks, easy replacement and maintenance of the male component and excellent swivelling functionality for connecting lines.

Other features and advantages of the present invention will be better understood upon reading of preferred embodiments thereof with reference to the appended drawings.

BRIEF DESCRIPTION OF THE DRAWINGS

FIG. 15 is a perspective view of the nut according to a preferred aspect of the swivelling coupling assembly of the present invention.

FIG. 16 is a longitudinal cut view of the nut of FIG. 15.

FIG. 17 is a close up view of area XVII of FIG. 16.

DESCRIPTION OF PREFERRED EMBODIMENTS

Figure 1:
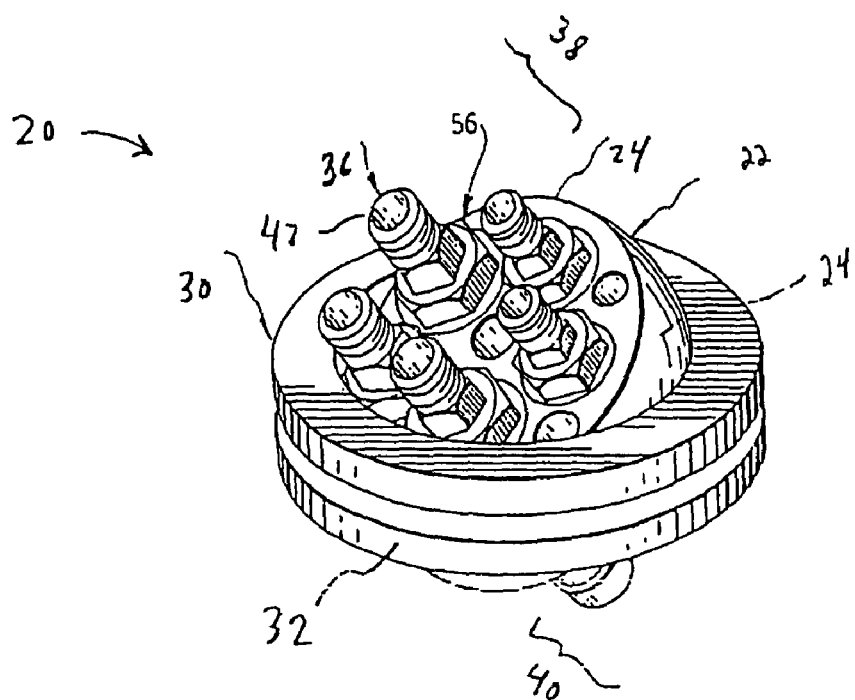
FIGS. 1 and 2 are top perspective views of a first preferred embodiment of the swivelling coupling assembly according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention concerns a swivelling coupling assembly for interconnecting lines containing a fluid and providing multifunctional swivelling between the lines.

It is to be understood that the swivelling coupling assembly may be used in hydraulic, plumbing, chemical processing, forestry and mining industries and applications, which connect ducts, pipes, lines, tubes, etc. More preferably, embodiments of the invention may be particularly useful in conjunction with hydraulic lines, and more preferably in dynamic heavy-duty machinery.

By "lines" it is meant that the swivelling coupling assembly may interconnect two or more fluid-containing, fluid-transmitting or fluid-receiving equipments. Lines are often called ducts, pipes, tubes, hoses or conduits. However, since lines often transport fluid to a component of a machine, which is particularly the case in hydraulically operated machinery, it should be noted that one of the "lines" interconnected by the swivelling coupling assembly may be embodied by a fluid-receiving machine component.

The "fluid" stored or transmitted through the lines is preferably a hydraulic fluid. Such hydraulic fluids are generally known in the art and are often based on chemicals such as glycol esters, ethers, castor oil or silicone, or a variety of other oils depending on the application. The hydraulic fluid is supplied to various equipment parts such as cylinders, rotors, etc. In certain embodiments of the invention, the fluid is permitted to lubricate the necessary moving parts of the coupling by partially leaking from the canalizations and/or bores into the interstices communicating therewith. The swivelling coupling assembly of the present invention is particularly useful in hydraulic systems, and still preferably in load-sensing hydraulic circuits. In alternative applications, the coupling may contain another fluid such as water or other aqueous liquids.

The term "swivelling" should be understood generally to include a variety of movements, including rotation about a single axis, pivoting about a point along an arc and in some cases pivoting about a point in three-dimensions. Depending on the desired application and the specific construction of the assembly, the "swivelling" functionality may offer from one to three degrees of freedom. Also, the swivelling is preferably allowed as a reversible movement. Also, where the swivelling is limited to a rotation about a single axis, this rotation is preferably enabled in 360 degrees, and more. There are indeed a wide variety of swivel movements possible using the coupling assembly of the present invention, as will be apparent in light of the description of the preferred embodiments.

Figure 2:
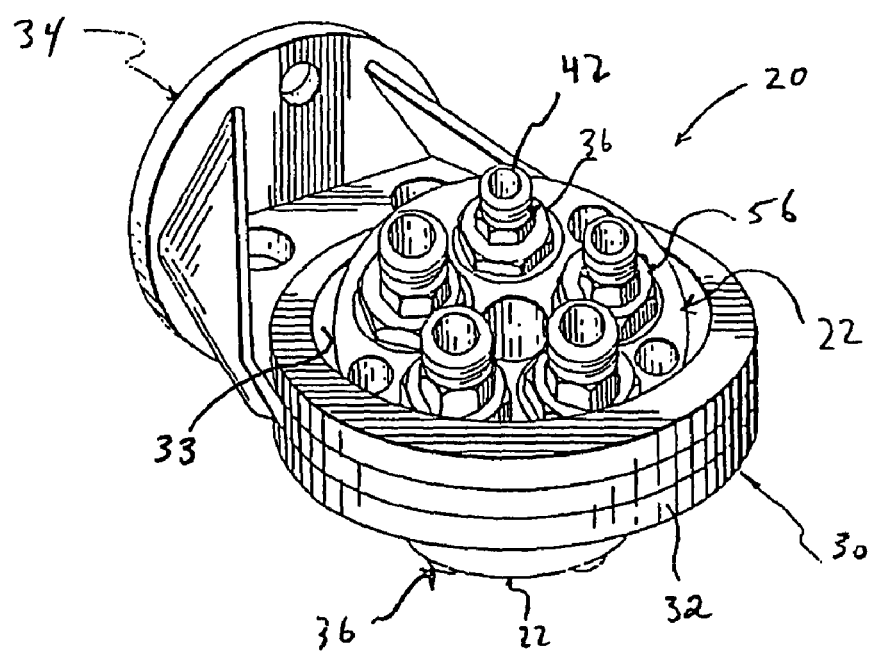
Figure 3:
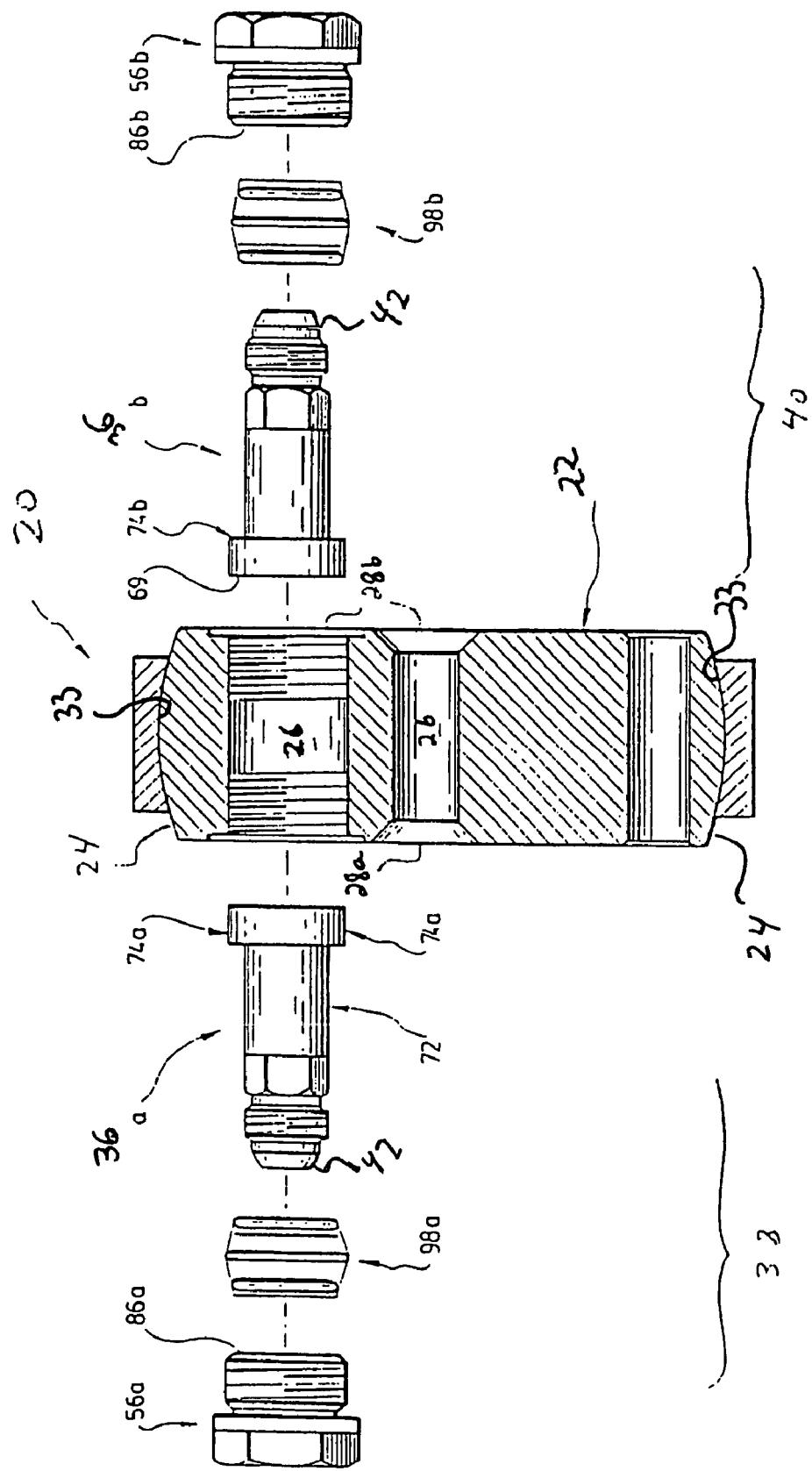
FIG. 3 is an exploded side view of the first embodiment of FIGS. 1 and 2.

FIGS. 1-3 illustrate a first embodiment of the swivelling coupling assembly 20.

Figure 5:
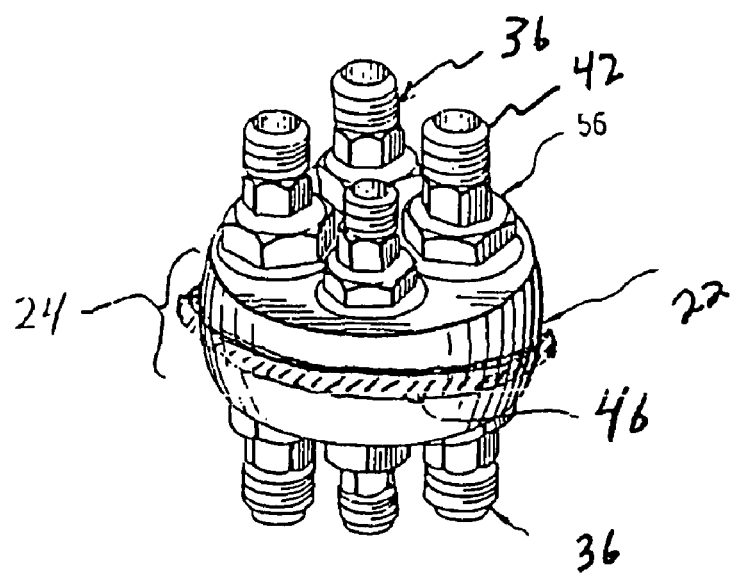
FIG. 5 is a top perspective view of part of the swivelling coupling assembly embodiment shown in FIG. 4.
Figure 4:
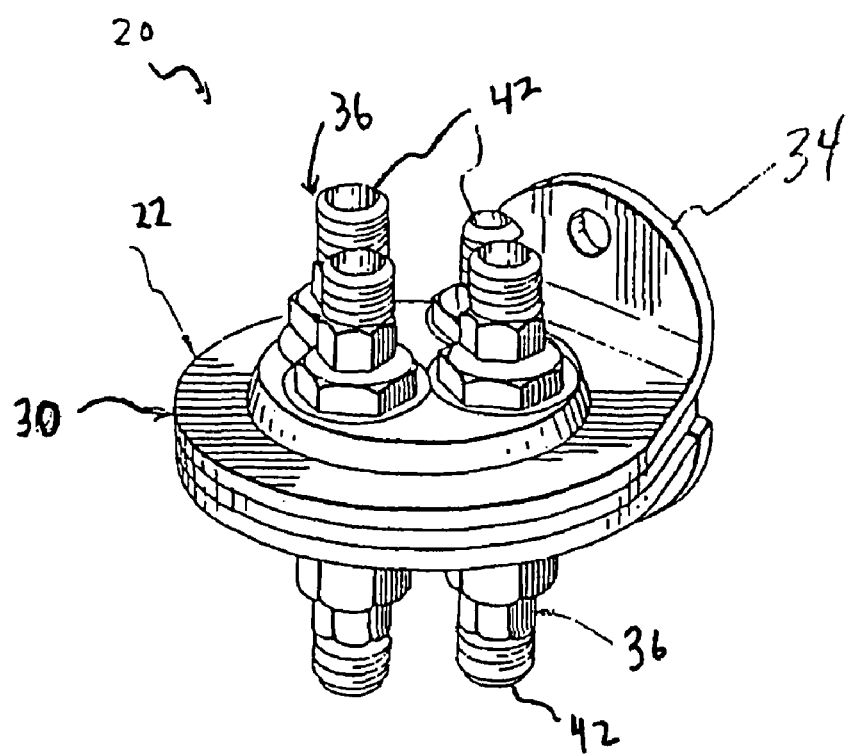
FIG. 4 is a top perspective view of second preferred embodiment of the swivelling coupling assembly according to the present invention.

FIG. 4 illustrates a second embodiment of the swivelling coupling assembly 20, and FIG. 5 illustrates a part thereof.

Figure 7:
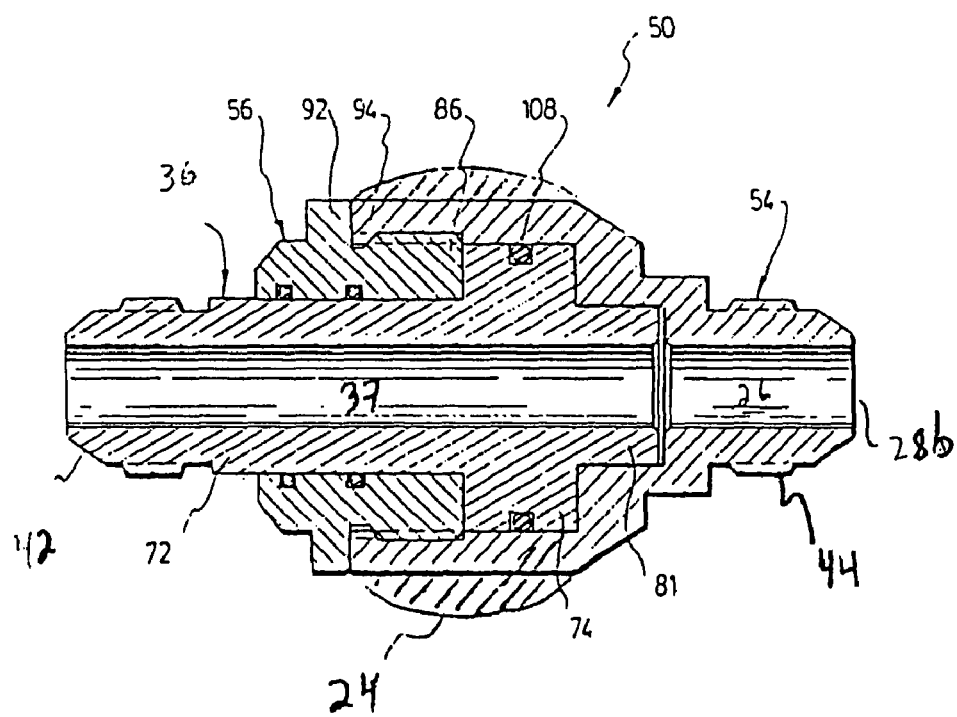
FIG. 7 is a longitudinal cut view of part of the swivelling coupling assembly according to a variant of the third embodiment of the present invention.
Figure 8:
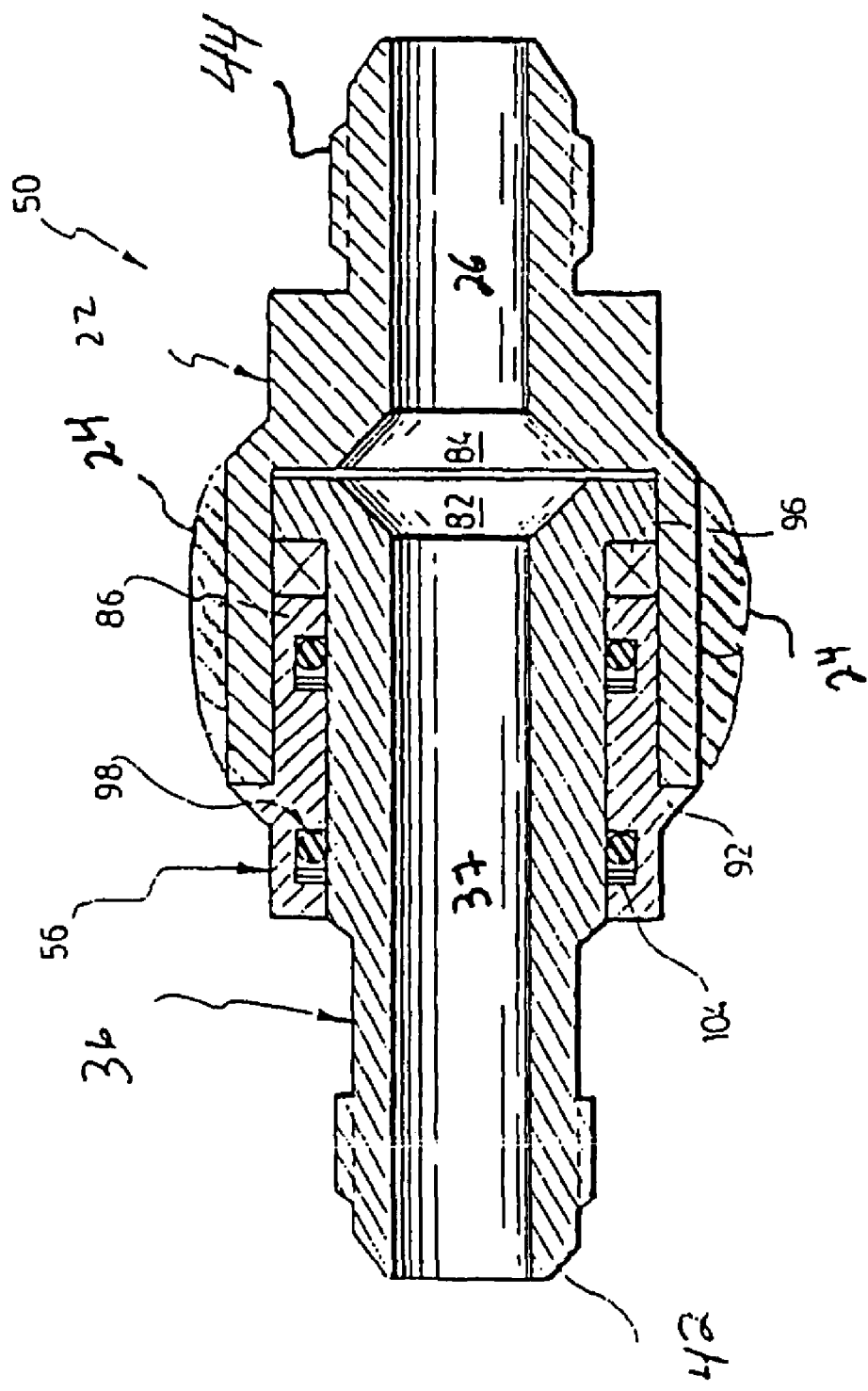
FIG. 8 is a longitudinal cut view of part of the swivelling coupling assembly according to another variant of the third embodiment of the present invention.
Figure 9:
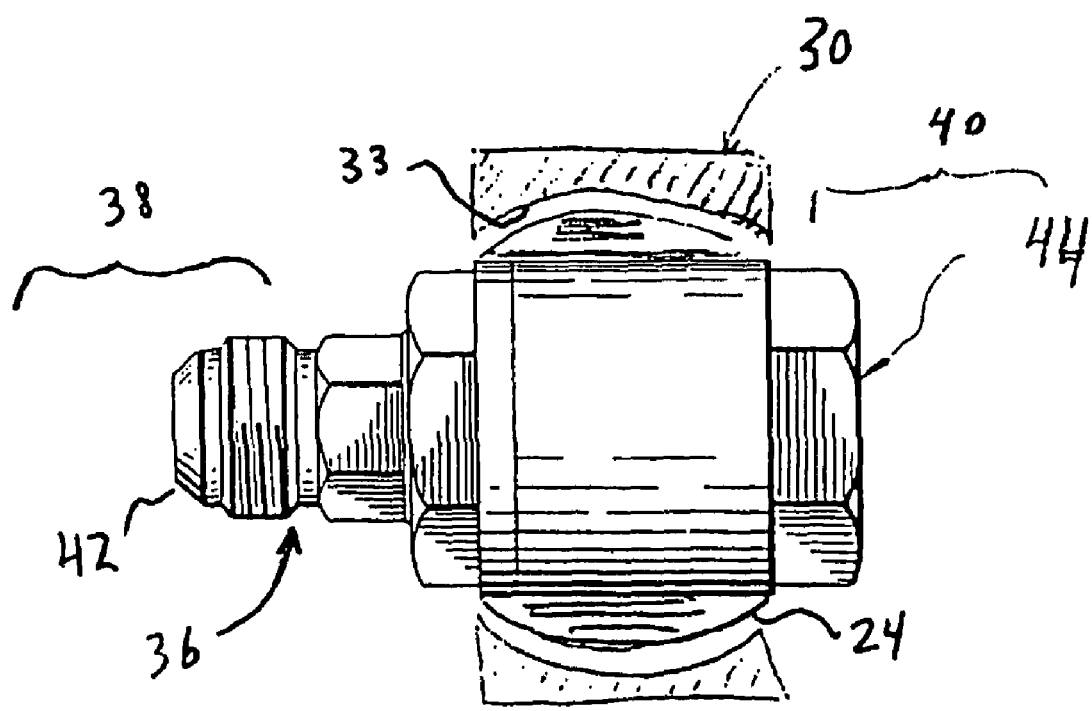
FIG. 9 is a side plan view of part of the swivelling coupling assembly according to a variant of the third embodiment of the present invention.

FIG. 9 illustrates a third embodiment of the swivelling coupling assembly 20, and FIGS. 6-8 and 18-19 illustrate a part thereof.

The First Embodiment

Referring the first embodiment shown in FIGS. 1-3, the assembly 20 includes a housing 22 having external surfaces 24. In this preferred embodiment, the housing 22 has a frustro-spherical shape and the external surfaces 24 are smooth and spherical.

The coupling assembly 20 provides an interconnection between pairs of lines. In the embodiment shown in FIGS. 1-3, five pairs of lines (not illustrated) may be connected through the assembly, but it will be understood that any appropriate number such as one or more of interconnections may be provided without departing from the scope of the present invention. Referring to FIG. 3, the housing 22 also has a bore 26 therethrough for each pair of lines (not illustrated). Each bore 26 has first 28a and second 28b apertures. Preferably, the bore 26 has a cylindrical and linear shape, but may alternatively have another configuration, such as angled or U shaped, for certain desired applications. It will be understood that all bores in a given housing need not have the same shape. The first aperture 28a allows the fluid to flow therethrough from one of the lines.

Referring to FIGS. 1-3, the assembly 20 also includes a retention member 30 for retaining the housing 22 while cooperating with the external surfaces 24 to allow the housing 22 to swivel spherically therein. The spherical swivelling enables three degrees of freedom to adapt to a variety of constraints. The retention member 30 preferably includes a bearing ring 32 having internal spherical surfaces (character 33 in FIGS. 2 and 3) cooperating with the external spherical surfaces 24 of the housing 22. The retention member 30 may alternatively have a form other than a ring for retaining the housing 22 while allowing the spherical motion. The bearing ring may cover a substantial part of the housing 22 for added protection as well. The retention member also preferably includes a bracket 34 for mounting the assembly to equipment. For instance, in the forestry industry the bracket 34 may be fixed to support proximate a rotatable feller-buncher head (not illustrated), the lines being relayed from the mobile vehicle frame or knuckle boom to the head itself via the swivelling assembly 20. The bracket 34 may be mounted using welding, bolts or other mounting means known in the art.

The interface between the external surfaces 24 and the retention member 30 is preferably provided with anti-friction means such as grease or spray (e.g. Teflon spray). Alternatively, other means known in the art for making the two surfaces slidable and cooperable to permit a swivelling motion may be used. It should be noted that the retention member 30 may have other components to retain the housing 22 while letting it swivel therein.

Referring to FIG. 3, the assembly 20 further includes at least one male component 36 mountable within each bore 26 of the housing 22. The male component 36 is preferably swivellable therein. The male component 36 is also preferably removably mounted in the bore 26, which may be done by a variety of means. It is also mounted so as to prevent external leakage of the fluid, which is preferably achieved by abutment surfaces and may also include a seal unit and/or sealing rings, and/or other components as will be discussed in further detail hereinbelow.

Referring now to FIGS. 6-8, 10, 12 and 19, the male component 36 also has a canalization 37 therethrough. The canalization is preferably cylindrical and linear, but may alternatively have a variety of other configurations, if desired. The canalization 37 allows the fluid to flow between the pair of lines once connected.

Referring back to FIG. 3, preferably there is a pair of first 36a and second 36b male components in each bore 26. These first and second male components are preferably mounted in an opposed configuration, but depending on the shape and configuration of the bore 26 they may have a different relationship with respect to one another.

When there is a pair of male components, the first male component 36a is connected to one of the lines at the first aperture 28a and the second male component 36b is connected to the other line at the second aperture 28b.

As mentioned hereinabove, each male component 36 is preferably swivellable within the corresponding bore 26. The swivel of the male component 36 in combination with the swivel ability of the housing 22 within the retention member 30, enables the assembly 20 to provide "double-swivel" functionality. In operation, this functionality is very advantageous for interconnecting lines and especially for interconnecting line clusters. When interconnecting line clusters, there is a plurality of pairs of lines grouped together in a cluster, each pair being associated with one bore 26 and with a pair of male components 36a, 36b on opposing sides of the housing 22. Referring to FIG. 1, oftentimes the lines will be grouped together as a cluster on an inlet side 38 of the assembly 20 and the lines will branch away from each other on the outlet side 40 of the assembly to supply specific machine parts with fluid. In response to torsion of the entire cluster of lines, the housing 22 is able to rotate within the retention member 30, thereby adapting and relieving the stress on the lines. What is more, in response to torsion of individual lines, often occurring on the outlet side 40 of the assembly, the male components 30 on that side are able to rotate individually, thereby relieving the stress on those lines while not introducing stress on the other lines.

In a preferred aspect of the first preferred embodiment, the male components 36 are mounted so as to be rotatable about a longitudinal axis thereof while being restrained within the bore 26. This presents particular advantages in adapting to torsion constraints and forces. Alternatively, the male components 36 may be mounted within the bore 26 so as to have a variety of swivelling ability around at least one axis. The male components may be of a variety of types, including the preferred type described hereinbelow or other fittings known in the art.

Though it is preferable to have a pair of male components 36a, 36b mounted within each bore, there may alternatively be a single male component 36 mounted in the bore 26, as illustrated in FIGS. 6-9 and 18-19. In these cases, the male component 36 has a port 42 for connecting to one line and the housing 22 has a port 44 for connecting to the other line at the second aperture.

Optionally, the main body of the housing 22 may have a hole or slot (not shown) therein and the retention member 30 also has a hole or slot (not shown) therein. These holes may be aligned so that a pin (not shown) may be inserted therethrough in order to provide an axis about which the housing rotates. Inserting the pin also limits the movement of the housing to one degree of freedom within the retention member. This optional characteristic enables ease of maintenance so that the housing may be rotated to gain access to a certain components and then held in that position for inspection or replacement of the components. Furthermore, a second pin (not shown) may be inserted within a second pair of holes in a similar way to eliminate all movement of the housing within the retention member.

The Second Embodiment

Referring to the second embodiment shown in FIG. 4, and part of which is shown in FIG. 5, the assembly 20 again includes the male components 36 mounted within the housing 22 which in turn is mounted within the retention member 32.

As shown in FIG. 5, the housing 22 has external surfaces 24 defining a circular mating element 46 around the periphery of the housing 22, which preferably takes the form of a circular ridge, for mating with the retention member 30. The retention member 30 preferably comprises a groove (not shown) for mating and being in slide relation with the circular ridge. Of course, other mating elements, including an opposite ridge-groove configuration, may be used. In operation, the housing 22 rotates about an axis that is normal to the plane defined within the circular mating element.

Preferably, the axis about which the housing 22 rotates is the parallel with the axes of rotation of the male components 36.

The Third Embodiment

Referring to FIGS. 6-9 and 18-19, there may be a single male component 36 mounted within the housing 22, for interconnecting a pair of lines. Preferably, the male component 36 is swivellable within the housing 22. In the illustrations, the housing 22 has external surfaces 24 that are spherical to cooperate with a retention member (shown as 30 in FIG. 9) to provide the spherical swivelling of the housing 22 with respect to the retention member.

Referring to FIG. 9, in operation the two lines connected to the inlet 38 and outlet 40 sides may be swivelled independently, for instance in opposite directions if desired.

Preferred Mounting Arrangement of the Male Component

Referring now to FIGS. 6-8 and 10-19, a preferred mounting arrangement of the male component will be described. It should be noted that this construction is given by way of example and that the male component may be mounted within the bore of the housing in a variety of ways, depending on the desired application and functionality. Also, the other embodiments and Figs will be discussed as required for comparison sake hereinbelow. It will be further understood that the arrangement disclosed below may be used for one, a portion or all of the male components within a given coupling assembly according to the present invention, possibly in combination with one or more different arrangements.

In FIGS. 6-8 and 10-19, the retention member is not shown. The ensemble 50 of components in these Figs will be described hereinbelow.

The ensemble 50 preferably has a construction enabling the coaxial interconnection of two lines, but it should be understood that it may be adapted to provide a different interconnection, such as a 90° connection or an oblique connection.

The ensemble 50 enables a considerable increase in the percentage of support surfaces (also called "push surfaces" or "abutting surfaces") between the components. The swivelling coupling unit is very robust, whether the operational forces in play are axial or radial (which is not the case for prior art coupling units). The swivelling ensemble 50 is simple, reliable, inexpensive to produce and to assemble, and is very easy to maintain in a good condition, because it can be easily dismantled.

The swivelling ensemble 50 includes three main components regardless of whether the setup is axial or angular or another arrangement known to a person skilled in the art; a male component 36 which is held between a housing 22 and a nut 56. The male component 36 and the nut form a coupling unit, each coupling unit being associated with one of the bores 26 of the housing 22.

Figure 14:
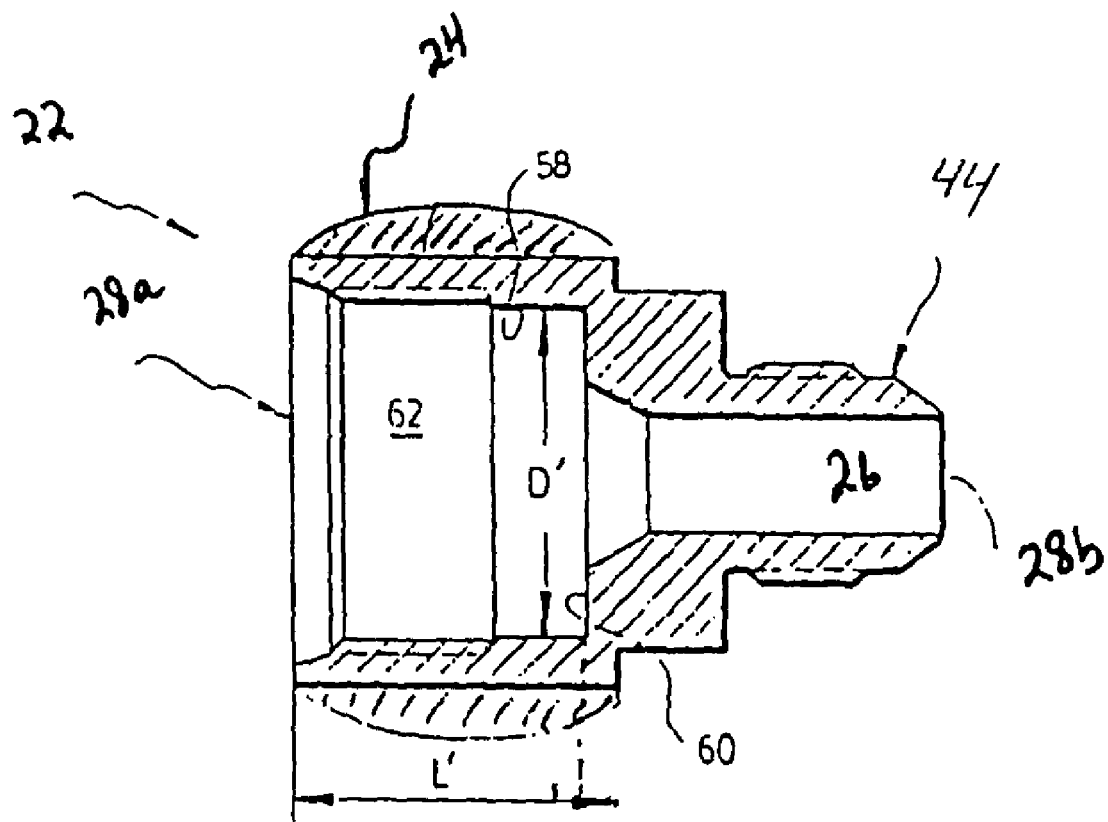
FIG. 14 is a longitudinal cut view of the housing according to a preferred aspect of the swivelling coupling assembly of the present invention.

Referring to FIG. 14, the housing 22 includes internal surfaces including at least one radial surface 58 and at least one axial surface 60. The internal surfaces 58, 60 define a cavity 62, which is part of the bore 26. The first aperture 28a is located at one end of the cavity. It is through the first aperture 28a that the male component 36 is insertable. It should be understood that the housing 22 may also include a plurality of cavities in which a corresponding number of male components and nuts may be introduced, as is shown is some of the preferred embodiments herein. The port 32 of the housing may have threads or a connection notch or collar to connect to the line. Also, the housing 22 may conceivably have a plurality of ports connectable to corresponding lines.

As shown in the embodiment of FIG. 14, the cavity 62 of the housing 22 preferably has one radial internal surface 58, defining a cylindrical wall of the cavity, and one axial internal surface 60 (which is also called a "stop surface") at the extremity of the cavity. Alternatively, as shown in FIG. 7, the cavity 62 has more internal surfaces (in this variant there are four surfaces, two axial and two radial) for cooperating with the external surfaces of the male component 36. More on this variant will be discussed hereinbelow.

Referring back to FIG. 14, the internal surfaces 58, 60 are preferably integrally formed with each other. This usually results from the machining of the housing 22 from a solid piece.

Briefly referring now to FIG. 3, the internal axial surface (character 60 in FIG. 14) may consist of the external face 69 of a second male component 36b securable within the housing 22. The second male component 36b is secured within the housing 22 from the opposite end as the first male component 36a, with a second nut 56b. It should also be noted, in this vein, that the internal surfaces may arise from different components being secured together to provide the preferred self-lubricating and swivelling abilities.

Referring back to FIG. 14, the internal surfaces 58,60 preferably intersect at a 90° angle, but may alternatively do so with a slight curve. Also preferably, the surfaces are provided with a very fine and smooth finish, to facilitate their slidability against corresponding surfaces of the male component principally. However, even when the finish is not perfect, containing some roughness, the surfaces become smoother through operational use, and thus may improve with time.

Referring now to FIG. 8, the port 32 of the housing 22 is preferably a projection type over which a line may be fastened. Alternatively, FIG. 9 illustrates that the port 32 may be a female type into which a line or line-adapter may be inserted. Of course, other types of ports known to a person skilled in the art may be provided.

Many other types of housings which are not illustrated may also be used in connection with the present invention.

Referring back to FIGS. 6-8, the male component 36 has a bore 37 therethrough. The bore 37 houses and/or transmits the fluid. The male component 36 includes a shank portion 72 and a flange portion 74. The flange portion 74 extends radially outward from the shank portion 72, which is preferably cylinder-shaped. The shank portion 72 has a port 42, preferably opposite the flange portion 74. There may also conceivably be a plurality of ports 42 provided on a single male component 36 and being connectable to corresponding lines.

Figure 18:
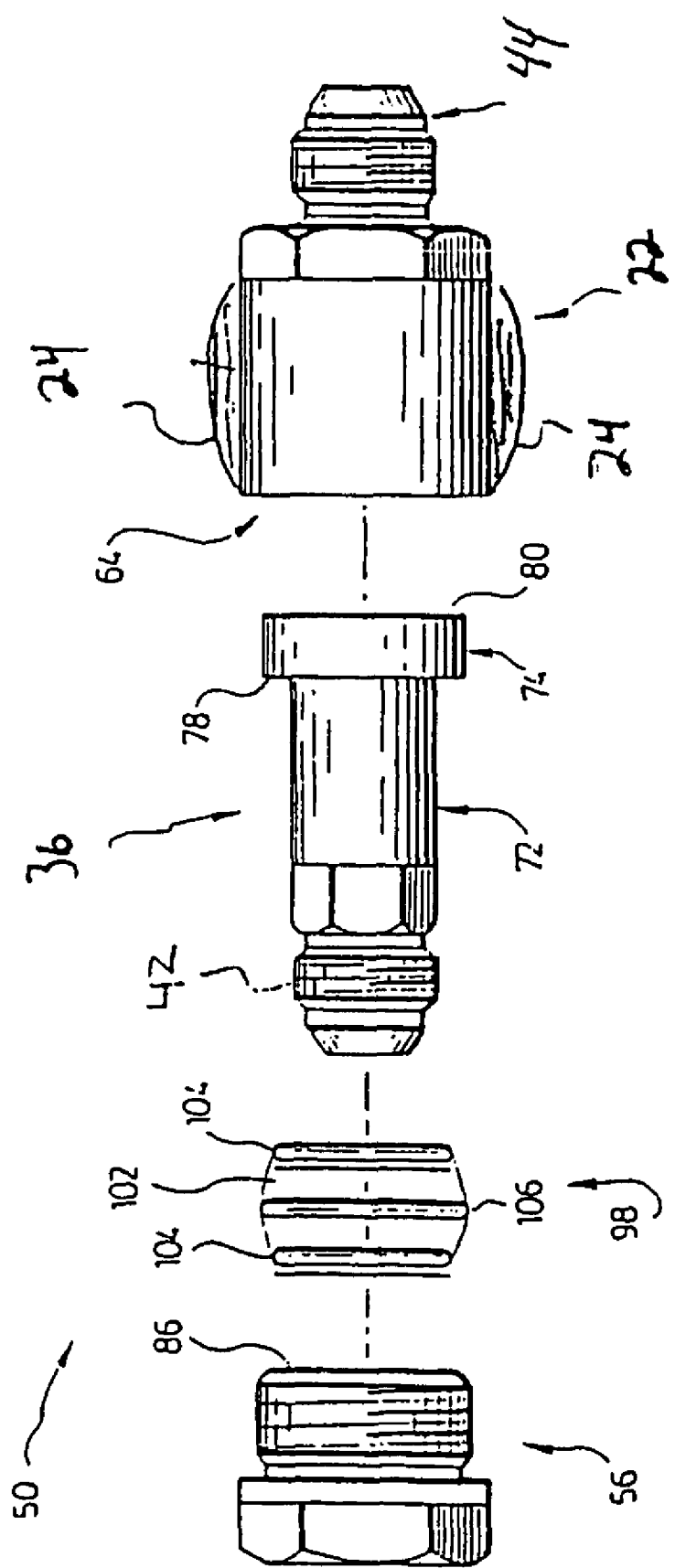
FIG. 18 is an exploded side plan view of part of the swivelling coupling assembly shown in FIG. 9.

As shown in FIG. 18, the male component 36 is insertable into the cavity of the housing by its first aperture 28a.

Referring back to FIGS. 6-8, once inserted the flange portion 74 of the male component 36 is able to cooperatively abut on the internal surfaces of the housing 22. Also, the bore 37 of the male component 36 and the bore 26 of the port 32 of the housing 22 are able to be in fluid communication. Preferably, the bores 26, 37 are collinear, as in the Figs. Alternatively, the bores may have a variety of orientations, depending on the desired application. 90° angles and oblique angles are desirable in some applications.

Figure 10:
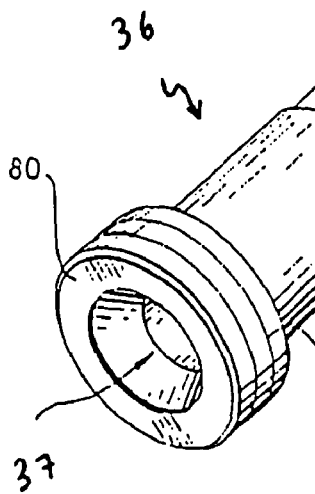
FIGS. 10 and 11 are respectively bottom and top perspective views of the male component according to a preferred aspect of the swivelling coupling assembly of the present invention.
Figure 11:
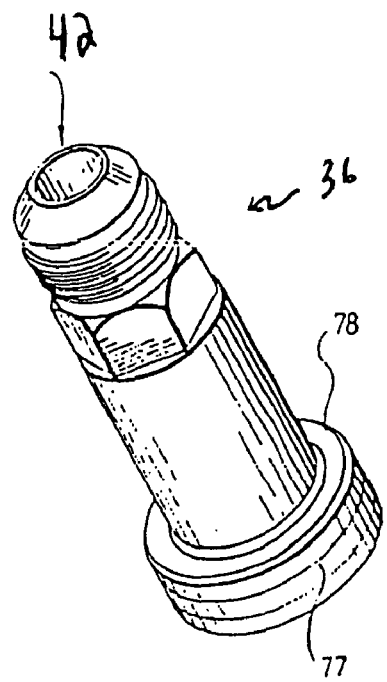
Figure 12:
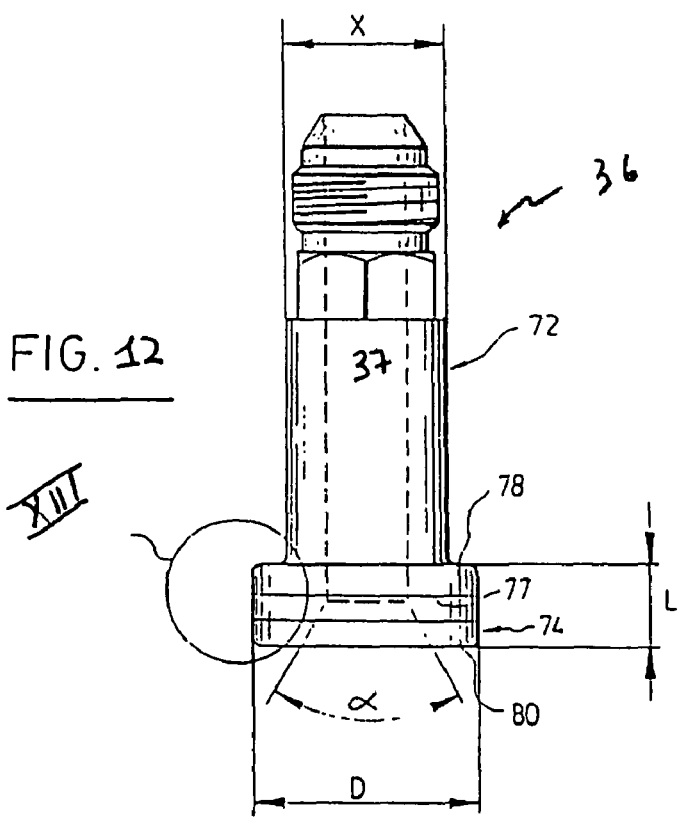
FIG. 12 is a longitudinal cut view of the male component of FIGS. 10 and 11.

Referring now to FIGS. 10-12, which illustrate an embodiment of the male component 36 having a T-shape, the flange portion 74 is preferably integrally formed with the shank portion 72 at the end of the shank portion 72. Also preferably, the flange portion 74 is radially continuous and symmetrical. The flange portion 74 is disk-shaped and extends at about a 90° with respect to the shank portion 72. This arrangement provides excellent support surfaces for abutting on the internal surfaces of the housing and the nut, thus distributing the forces (i.e. decreasing the pressure) in an advantageous way. This also enables the velocity of the fluid lubricating the components to be cut, as the case may be in certain applications. Alternatively, the flange portion 74 may have another shape which cooperates with the internal surfaces of the housing, by being curved or angled for example, which will be further discussed hereinbelow.

The flange portion 74 preferably has an outer circumferential surface provided with at least one circumferential score 77. Preferably, there are three spaced-apart scores 77. The scores 77 facilitate the partial leaking and pressure cutting of the lubrication fluid, between the internal surfaces of the housing and the flange portion 74, and angular surface contacts.

Still referring to FIGS. 10-12, the flange portion 74 preferably includes first 78 and second 80 external faces in opposed and parallel relationship. The first external face 78 faces the nut (character 56 in FIG. 6) while the second external face 80 faces the axial internal surface (character 60 in FIG. 14) of the housing 22. Preferably, the first external face 78 of the flange portion is flat and the cooperating face of the projection of the nut is also flat. Alternatively, the corresponding nut and flange portion faces may have another form, such as convex-concave or vice versa (not illustrated), to provide good support surfaces.

It should be noted that the diameter D of the flange portion 74, and the corresponding size of the nut and housing, may be modified to obtain various different force distributions, fluid behaviour and friction coefficients between the components.

Figure 6:
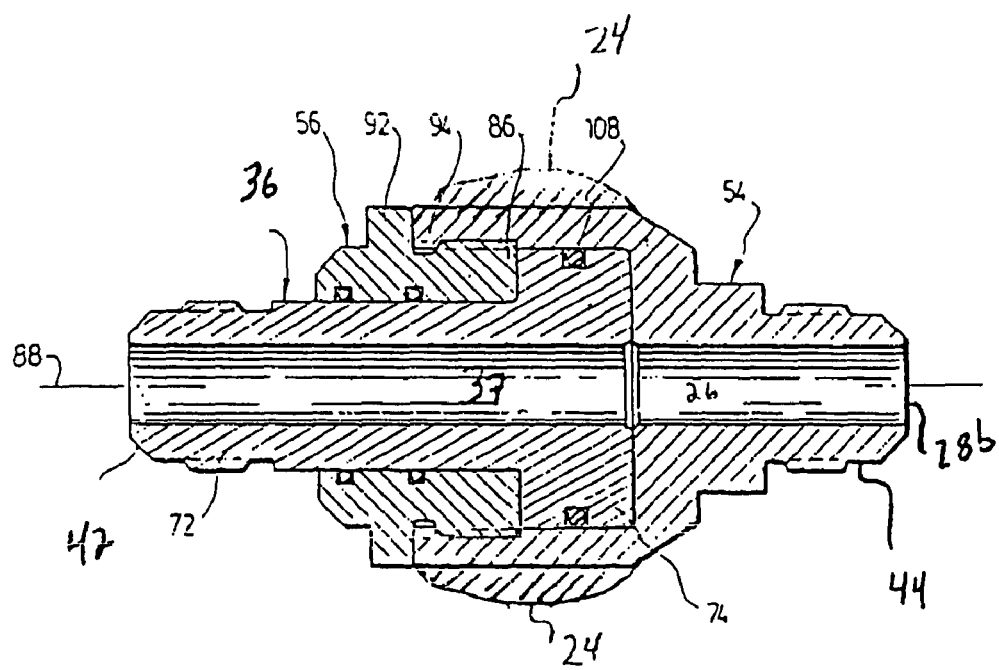
FIG. 6 is a longitudinal cut view of part of the swivelling coupling assembly according to a third embodiment of the present invention.

Referring to FIGS. 6 and 8, one variant is shown in which the flange portion 74 is provided on the shank portion 72 so that the male component is T-shaped in side plan view. The orientation of the internal surfaces of the housing 22 is preferably such that they substantially correspond to the T-shape of the male component 36, as illustrated.

Referring now to FIG. 7, another embodiment is shown in which the shank portion 72 further includes a segment 81 opposite the port 42 of the shank portion 72. The flange portion 74 is provided between the segment 81 and the port 42 of the shank portion 72 so that the male component is cross-shaped in plan side view. The orientation of the internal surfaces of the housing 22 is preferably such that they substantially correspond to the cross-shape of the male component 36, as illustrated.

It should nevertheless be understood that the shape of the male component 36 may be modified in a plurality of ways. In this preferred construction of the ensemble, the internal shape of the cavity should have a corresponding shape to house the flange portion 74, to provide support surfaces for distributing forces while allowing adequate play for lubrication and rotational movement.

Figure 19:
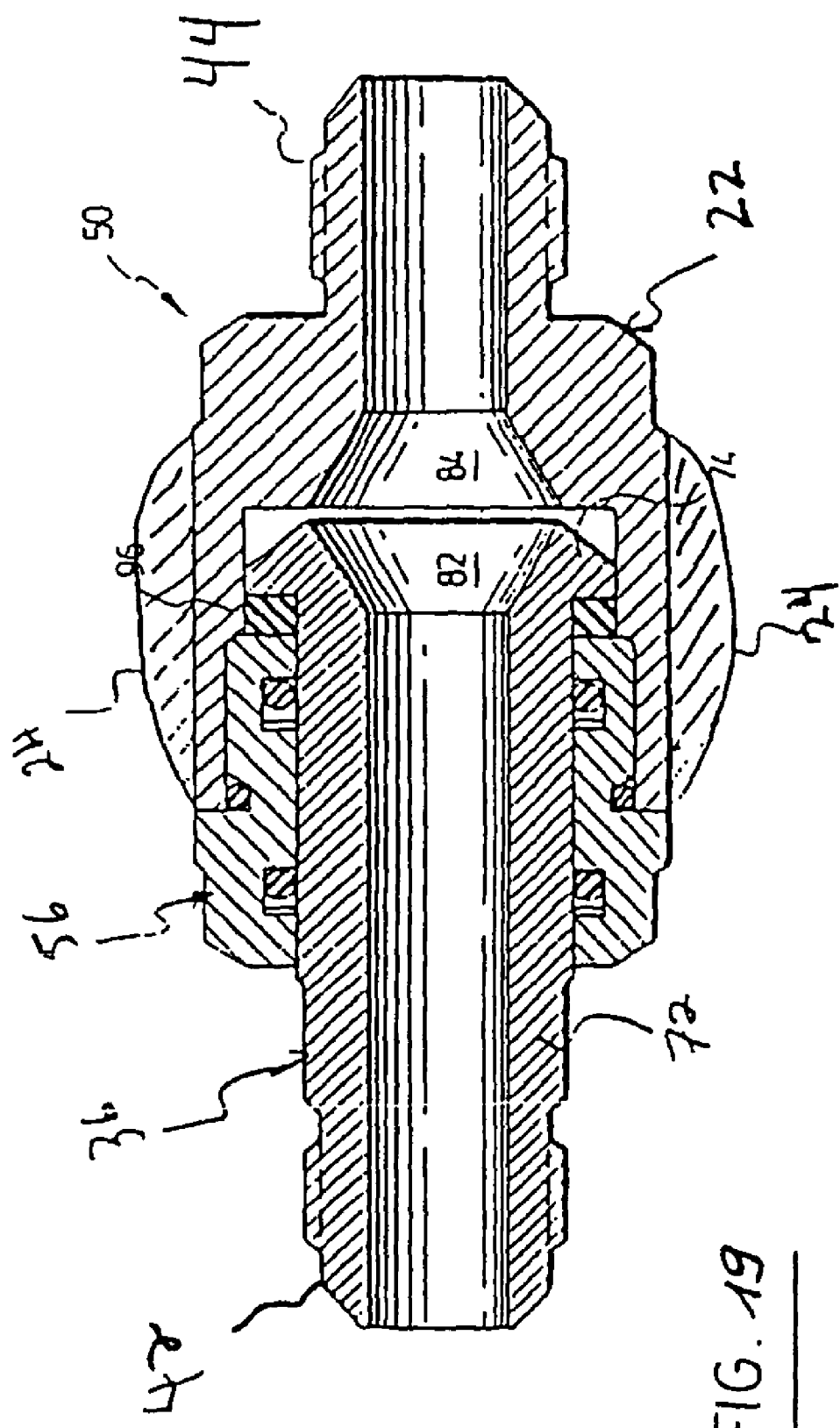
FIG. 19 is a side plan view of part of the swivelling coupling assembly according to another variant of the third embodiment of the present invention.

Referring to FIG. 19, the flange portion 74 may have surfaces that are bevelled, and may also have surfaces that are curved. These bevelled or curved surfaces affect the fluid movement between the lubricated surfaces of the coupling unit and the force distribution.

Since the pressurized lubricating fluid exerts pressure perpendicularly with respect to the solid surfaces of the coupling unit components, by varying the angles and curvatures and surface area of the male component, different force-distribution effects may be achieved. Also, in dynamic applications, this may be particularly desired.

Referring to FIG. 8, in this embodiment of the invention the bore 37 of the male component 36 includes a junction 82 which is opposed to a corresponding junction 84 of the bore 26 of the housing 22. The junctions 82, 84 are partially leakable to enable the fluid to first of all leak between the male component 36 and the axial internal surface (character 60 in FIG. 14) for lubrication. The junctions 82, 84 are preferably openly tapered with respect to each other. They are preferably frustro-conical-shaped, which still preferably has an angle α of about 60°. This shape reduces fluid turbulences and axial pushes against the nut, and facilitates the partial leaking of the fluid for lubrication.

Referring to FIG. 19, the flange 74 and the junction 82 may have another shape. FIG. 19 illustrates the frustro-conical type. It should be noted that many other shapes are possible, and the two junctions 82,84 may or may not be identical.

Referring still to FIG. 8, the flange portion 74 preferably has an amount of play within the cavity of the housing so that under hydraulic fluid pressure the junctions 82, 84 enable the hydraulic fluid to leak therebetween. More on the play of the male component within the cavity will be discussed hereinbelow.

Referring now to FIGS. 6-8, the swivelling coupling unit also includes a nut 56, which is securable within the cavity of the housing 22 and surrounding the shank portion 72 to radially restrain the same. Preferably, the nut surrounds the shank portion 72 from the port thereof to the flange portion, which allows for improved support, stability and resistance to forces.

Referring now to FIGS. 6-8, the nut also has a projection 86 extending axially and internally into the cavity of the housing 22 for axially restraining the flange portion 74, while allowing the male component 36 to rotate with respect to the housing 22 and the nut 56. The rotation occurs about a longitudinal axis 88 of the shank portion 42.

Referring to FIG. 15, the nut 56 preferably has external threads 90 and the at least one radial surface of the housing has corresponding internal threads, to secure the nut 56 within the cavity of the housing. Alternatively, these components may be unthreaded and be bolted, clamped or otherwise connected.

Referring back to FIGS. 6-8, the nut 56 preferably has a lip 92 extending over a perimeter rim 94 of the open end of the cavity.

Also preferably, the shank portion 72 of the male component 36 is extendable through the nut 56 so that its port 42 is located beyond the nut 56.

Advantageously, the swivelling coupling unit may be lubricated by hydraulic fluid contained in the lines that it interconnects.

In operation, the hydraulic fluid contained in the bores 26, 37 is under hydraulic pressure. Operating pressures vary depending on the application, be it heavy or light. Typical ranges of hydraulic pressure in the forestry industry, for example, are between about 50 and about 4000 psi, and up to around 5000 psi in some cases. In load-sensing hydraulic circuits, the operating pressures most often vary between about 250 psi and 3000 to 4000 psi.

In certain applications such as the forestry industry, the swivelling coupling unit is preferably used in hydraulic systems that are load-sensing (also called "shock") circuits. In these circuits, hydraulic pressure is sent to match the load requirement. There is therefore an ebb and flow of hydraulic fluid in and out of the interstices of the ensemble 50. When the pressure is high the fluid pushes the male component against the nut, and when it is low the male component experiences more "freedom" within the cavity. The torque required during low fluid pressure is decreased. The swivelling coupling unit of the present invention is particularly suited for load-sensing hydraulic circuits. At low pressures, the torque required for swivelling is quite low, which enables the interconnected lines to be displaced, rotated, etc. At operational pressures, such as around 3000 to 4000 psi for many machines, the torque required for rotation is high enough that very little rotation is possible. It should be understood, however, that in high-load operation there is usually little need for high rotation capacity, but moreover a great need for good force distribution between the nut and the male component. The swivelling coupling unit provides excellent force distribution and its components are not easily adversely affected.

Figure 13:
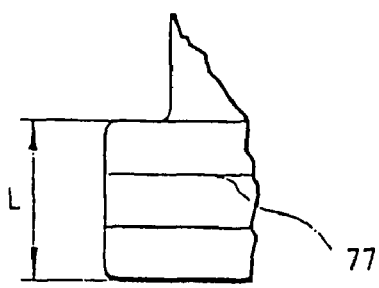
FIG. 13 is a close up view of area XIII of FIG. 12.

Referring to FIG. 13, this partial leaking is facilitated by the radial and axial play of the flange portion 74 within the cavity. More specifically, the flange portion 74 preferably has a diameter D and a width L.

Referring still to FIG. 13 while also to FIGS. 14 and 16, the cavity 62 of the housing 22 has an internal depth of L', and the insertion portion of the nut 36 has a length of L". The internal depth L' of the cavity is slightly greater than the sum of L' and L", thus enabling an amount of axial play. Preferably, the amount of axial play is between about 0.005 and about 0.08 inches. Still preferably, the amount of axial play is between about 0.03 and about 0.08 inches.

Referring to FIG. 12 while also to FIG. 14, the cavity 62 of the housing 22 has an internal diameter D', which is slightly greater than the diameter D of the flange. Consequently, the radial play is approximately D'-D. Preferably the radial play is between about 0.005 and about 0.08 inches. Still preferably, the amount of radial play is between about 0.015 and about 0.03 inches.

Referring to FIG. 8, under hydraulic pressure, the hydraulic fluid leaks in between the junctions 82, 84 into the interstices of the ensemble 50. Depending on the design and orientation of the flange portion 74 and internal surfaces of the housing 22, and thus the axial play and the radial play, as well as the operating pressure and a myriad of other variables, the hydraulic fluid will partially leak between the male component 36 and the internal surfaces.

Referring to FIGS. 12 and 16, the shank portion 72 of the male component 36 has a diameter X that is slightly smaller than the diameter X' of the nut 56. The preferred range of the tolerance X'-X is between about 0.002 and about 0.015, still preferably between about 0.002 and about 0.005 inches, but may be modified as well. For instance, this tolerance may be that recommended by an O-ring manufacturer for a given application and coupling unit dimensions.

Referring generally to FIGS. 6-8, the hydraulic pressure pushes the male component 36 axially toward the nut 56.

Once pressurized, the pressure inside the housing 22 is substantially uniform in all directions and pushes perpendicularly on the surfaces. The pushing of the flange portion 74 on the nut 56 is thus approximately the differential between the front and back surfaces of the flange portion 74. Accordingly, the pushing may be varied, in certain applications, by modifying the dimensions and/or angles of the surfaces.

In the embodiments shown in FIGS. 3 and 4, this pressure results in the direct abutment of the flange portion 74 against the projection 86 of the nut 56. These embodiments are more preferred for low pressure applications or non-hydraulic applications.

In the variant shown in FIG. 8, the ensemble 50 further includes a slide-ring 96 surrounding the shank portion 72 and disposed between the nut 56 and the first external face of the flange portion 74. This slide-ring 96 reduces the friction coefficient between the components, most notably between the flange portion 74 and the nut 56. The slide-ring 96 is particularly desirable in high-pressure hydraulic systems (or alternatively in applications where the fluid is less lubricating) since the axial pressure on the male component 36 greatly increases the friction between the flange portion 74 and the nut 56. Preferably, the slide-ring 96 is composed of NYLATRON® NSM nylon material group, NYLOIL™ nylon plastic material, NYCAST™ nylon plastic material, TEFLON® fluoropolymers, Ceramic or another suitable material for such a component. Alternatively or additionally, an extra lubricant may be added between the flange portion 74 and the projection 86 of the nut 56.

FIG. 8 illustrates that under internal fluid pressure the flange portion 74 is pushed toward the projection 86 of the nut 56, and thus abuts on the slide-ring 96. The slide-ring 96 differs greatly in its functionality and advantageousness when compared to ball- and needle-bearings. The ball- and needle-bearings suffer from higher, more focalized pressure points. The slide-ring 96, on the contrary, enables a distribution of forces decreasing the pressure between the components, which is in line with the present invention. This enables the swivelling coupling unit to have improved swivelling performance at higher pressures in the range of 3000 to 5000 psi for example. Preferably, the slide-ring 96 has a flat disk shape, but may also have an O-ring shape to reduce the coefficient of friction.

It should be mentioned that in many embodiments of the present invention, ball- and/or needle-bearings may be used to facilitate the swivelling movement of the male component within the housing and/or of the housing within the retention member.

When the flange portion 74 is pressed against the nut 56 directly (as in FIGS. 6 and 7) or against the slide-ring (as in FIG. 8), the second external surface of the flange portion 74 is held in spaced relation to the internal axial surface of the housing 56, and corresponds to the amount of axial play. Also, in some applications, a barrier may be formed by the contact between the nut 56 and the flange portion 74, to thereby partially or substantially hinder the flow of the fluid therebeyond.

Referring still to FIG. 8, the ensemble 50 preferably further includes at least one seal-unit 98. The seal-unit 98 is preferably a sealing ring, composed of a polymer material, which cooperates with the nut 56, between the same and the shank portion 72.

FIG. 18 best illustrates the preferred seal-unit 98, not yet assembled within the coupling unit.

It should be noted that the barrier created by the contact between the nut and the flange portion may help protect the seal-unit 98 from hydraulic shocks (also called "hydraulic rams") or other types of fluid shocks in the coupling.

Referring to FIG. 16, the nut 56 preferably includes at least one internal annular groove 100, preferably two such grooves 100, so that the corresponding rings of the seal-unit 98 are partially insertable therein.

Referring to FIG. 16, the seal-unit 98 preferably includes an annular portion 102 composed of plastic material, and two rings 104 disposed radially around the opposite ends of the annular portion 102. In this case, the nut 56 further includes two internal annular grooves 100 so that the two rings 104 are respectively partially insertable therein. This is illustrated in FIG. 8.

A close-up of the groove is shown in FIG. 17.

Referring to FIG. 8, once the ensemble 50 is assembled and in operation, the seal-unit 98 is pressed in between the shank portion 72 and the nut 56 to cut the pressure of any fluid leaking through the interstices of the ensemble 50. Being disposed around the shank portion 72, the seal-unit 98 facilitates the sealing of the ensemble 50 while allowing the internal lubrication thereof.

The seal-unit 98 preferably acts as a "fluid-tight" joint stopping the lubricating fluid from leaking out of the coupling unit. Thus, the seal-unit 98 may include O-rings, back-up rings, etc. Also, the seal-unit 98 may be easily replaced, in the event that it loses its efficiency.

Referring to FIGS. 6 and 7, a joint 108 may also be arranged between the male component 36 and the radial surfaces of the housing 22, for lubrication purposes between the male component 36 and the housing 22. This joint 108 may be a snap-ring, a square joint, or another type of joint or connection point. In fact, the specific joint choice depends on various operating conditions and design specifications, and therefore may be chosen by a person skilled in the art. Also, the joint may be provided in a groove of the flange, to provide a fissure, crack or opening through which the fluid is permitted to partially leak to help lubricate the coupling unit.

Various sealing joints may be used to cut the velocity of the fluid so that if the fluid leaks past one of the seals, it is less likely to leak past the next seal. Thus a series of seals may be used and designed by a person skilled in the art.

The swivelling coupling unit employs a "sealing" technique, including the seal-unit 98 and possibly other seals, to ensure adequate lubrication while avoiding external leaks. The sealing technique, which may be called a "labyrinthine" technique, enables a reduction of the overpressure (overloading pressures) that may be destructive to the sealing by slowing the displacement of the fluid toward the seals, thereby increasing the longevity and the durability of the same. As was described above, the velocity of the lubricating fluid is advantageously cut and diminished as the fluid is forced to run into a variety of walls, surfaces, scores, joints, angles, small openings, or other "obstacles", before it reaches the end of the coupling unit. In a number of embodiments and applications, a barrier is formed by the contact between the nut and the flange portion, before the seal-unit 98, to slow the fluid before and aid in the sealing. In some embodiments and applications, therefore, as the fluid is pushed through these obstacles, it lubricates the interior while losing velocity, and so cannot escape or leak out of the ensemble or coupling unit.

Furthermore, the technique of using "progressive sealing" (a series of sealing points) coupled with the arrangement of the components provides efficiencies for a variety of applications. As touched on hereinabove, the series of seals "progressively" cuts the velocity of the fluid and eventually seals the fluid within the ensemble, very efficiently.

For example, in high pressure situations, there are preferably two back-up rings and two O-rings for sealing, after the barrier formed by the contact between the nut and the flange portion.

It should be noted that depending on the desired application, a variety of sealing techniques may be used. When the lines transmit fluid at a given flow rate, the sealing technique must deal with the fluid velocity; whereas when there is a given constant fluid pressure but no flow, the sealing technique should be provided to handle the given pressure.

Referring to FIG. 3, the amount of axial play provided to the male components 36a,36b depends on the distance between the projections 86a,86b and the widths of the flange portions 74a,74b, once installed in the housing 22. This "double" swivelling coupling assembly provides advantages with respect to its swivelling ability, adaptability and functionality.

It should be understood when considering the preferred coupling unit's construction and operation that the fluid systems in which the coupling may be incorporated, are often very complex. It is thus difficult to characterize various properties—such as the flow regime, the force distribution, and the pressures—within the ensemble. Many systems are dynamic or semi-dynamic, which further complicates the matter. For instance, load-sensing hydraulic circuits have fluctuations in fluid pressure which are rapid and dramatic, which in turn may cause complex effect within the coupling unit. The movement of the fluid and of the ensemble components, as well as the fluid pressure and the other external constraints on the lines, result in various friction coefficients, for example, between the ensemble's components. The interaction of the ensemble's components is greatly dependant on a variety of complex, interrelated factors.

It should also be understood that the swivelling coupling does not require ball-bearings, needle-bearings or roller-bearings. These shape-based bearings present some disadvantages especially in heavy-duty dynamic machinery applications. The swivelling coupling preferably include fluid bearings, i.e. the lubricating fluid, and may also include material bearings such as the slide-ring. It should be noted that the fluid bearings and material bearings do not hinder the high support surfaces of the components of the coupling and thus are preferred.

Materials

The above-mentioned components of the swivelling coupling assembly 20 may be constructed using a variety of materials. Stainless steel, titanium, aluminum, among other metals, may be employed to fabricate one or all of the components. Also, extruded reinforced polymers may be used for some components, when appropriate.

The swivelling coupling assembly according to the preferred embodiments of the present invention presents numerous advantages. The assembly enables regrouping a cluster of fittings and lines at one dynamic joint; multifunctionally swivelling ability; adapting to special and diverse constraints on the lines and clusters thereof; providing increased safety by enabling lines and other components to move rather than become damaged or ruptured; and having a simple and robust design for efficient and low cost fabrication, installation and maintenance.

It should also be understood that the present invention is not limited to the preferred embodiments here-described, but the scope of what has actually been invented includes many variations to the described and illustrated embodiments and variants.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A swivelling coupling assembly for providing a swivellable connection in a load-sensing hydraulic circuit between at least a pair of lines containing a hydraulic fluid, the swivelling coupling assembly comprising:
   a housing having external spherical surfaces;
   a retention member for retaining the housing while cooperating with the external spherical surfaces to allow the housing to spherically swivel therein;
   said housing having bores therethrough, each bore having first and second apertures, the first aperture allowing the fluid to flow therethrough from one of the lines; and
   at least two pairs of male components, each pair being mountable within one of the bores of the housing, each male component being independently swivellable within said bore and configured to prevent external leakage of the fluid, each male component having a port connectable to a line at a corresponding aperture of said bore and further having a canalization allowing the hydraulic fluid to flow between a pair of lines connected to the port.

2. The swivelling coupling assembly of claim 1, wherein each male component is removably mountable and rotatable within the bore about a longitudinal axis of the male component.

3. The swivelling coupling assembly of claim 2, wherein each male component is abuttable on internal surfaces of the bore.

4. The swivelling coupling assembly of claim 3, further comprising coupling units each associated with one of the bores and including a corresponding one of the male components removably mountable within said bore, said coupling unit further including a nut securable to the housing and surrounding the corresponding male component to radially and axially restrain said corresponding male component, such that the corresponding male component is rotatable solely about the longitudinal axis thereof.

5. The swivelling coupling assembly of claim 4, wherein the nut of said coupling unit includes a projection extending through the second aperture and being securable within the corresponding bore of the housing.

6. The swivelling coupling assembly of claim 5, wherein, for each coupling unit, the male component includes a shank portion and a flange portion radially extending therefrom, the flange portion being opposite the port and being cooperatively abuttable on at least one radial surface of the bore of the housing, and wherein the projection of the nut axially restrains the flange portion of the male component within the bore.

7. The swivelling coupling assembly of claim 6, wherein said coupling unit further includes a seal unit arranged between the nut and the shank portion.

8. The swivelling coupling assembly of claim 6, wherein, in each coupling unit, the flange portion of the male component and the radial surface of the bore of the housing cooperate to allow a leak so that the fluid is partially leaked between the male component and the radial surface, thereby lubricating the male component to facilitate rotation thereof within the housing.

9. The swivelling coupling assembly of claim 6, wherein the bore of the housing is further defined by a stop surface facing the projection of the nut of a corresponding coupling unit for housing the flange portion therebetween.

10. The swivelling coupling assembly of claim 9, wherein the stop surface and the projection of the nut define therebetween an amount of axial play for the flange portion.

11. The swivelling coupling assembly of claim 9, comprising additional pairs of male components, each additional pair of male components including respective first and second male components mountable in a corresponding bore.

12. The swivelling coupling assembly of claim 11, wherein each pair of the first and second male components are in an opposed configuration so as to provide the stop surface for each other.

13. The swivelling coupling assembly of claim 11, wherein each pair of the first and second male components are coaxial and are rotatable with respect to the housing about a longitudinal axis of the respective pair of male components.

14. The swivelling coupling assembly of claim 11, wherein each bore of the housing and the corresponding canalizations of each pair of male components are coaxial.

15. The swivelling coupling assembly of claim 1, wherein the retention member includes a bearing ring having internal spherical surfaces for cooperating with the external spherical surfaces of the housing.

16. The swivelling coupling assembly of claim 15, wherein the retention member further includes a bracket attached to the bearing ring.

17. The swivelling coupling assembly of claim 1, wherein the housing has a frusto-spherical shape with two opposing flat ends, the bore and the male components extending normally with respect to the flat ends.

18. The swivelling coupling assembly of claim 17, wherein the retention member includes a bearing ring having a pair of opposite-facing annular surfaces, and each flat end of the housing is located beyond one of the corresponding annular surfaces.

* * * * *